(12) United States Patent  
Koike et al.

(10) Patent No.: US 8,408,691 B2
(45) Date of Patent: Apr. 2, 2013

(54) INK JET RECORDING INK, INK JET IMAGE FORMING METHOD AND INK JET RECORDING APPARATUS

(75) Inventors: Shoji Koike, Yokohama (JP); Ikuo Nakazawa, Kawasaki (JP); Taketoshi Okubo, Asaka (JP); Akira Kuriyama, Atsugi (JP); Masayuki Ikegami, Atsugi (JP); Atsuhito Yoshizawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/130,875

(22) PCT Filed: Jan. 14, 2010

(86) PCT No.: PCT/JP2010/050655
§ 371 (c)(1),
(2), (4) Date: May 24, 2011

(87) PCT Pub. No.: WO2010/084892
PCT Pub. Date: Jul. 29, 2010

(65) Prior Publication Data
US 2011/0227976 A1 Sep. 22, 2011

(30) Foreign Application Priority Data
Jan. 22, 2009 (JP) ................. 2009-012086

(51) Int. Cl.
*G01D 11/00* (2006.01)
(52) U.S. Cl. ................. 347/100; 347/95; 106/31.6
(58) Field of Classification Search ............ 347/95–100, 347/20, 21, 9; 106/31.6, 31.27, 31.13; 523/160, 523/161
See application file for complete search history.

(56) References Cited

U.S. PATENT DOCUMENTS 4,557,761 A 12/1985 Kobayashi et al.
4,632,703 A 12/1986 Koike et al.
(Continued)

FOREIGN PATENT DOCUMENTS

JP 61-076373 A 4/1986
JP 10-195360 A 7/1998
(Continued)

OTHER PUBLICATIONS

Aug. 4, 2011 International Preliminary Report on Patentability and Apr. 13, 2010 Written Opinion in International Patent Application No. PCT/JP2010/050655.

(Continued)

*Primary Examiner* — Manish S Shah
(74) *Attorney, Agent, or Firm* — Fitzpatrick, Cella, Harper & Scinto

(57) ABSTRACT

The invention provides an ink jet recording ink containing a self-dispersion pigment to a surface of which an anionic functional group represented by the following general formula (1) is bonded directly or through another atomic group, an ammonium salt of an organic carboxylic acid, water, and a water-soluble compound having a hydrophilicity-hydrophobicity coefficient of 0.26 or more as defined by the following equation (A), the ink having a surface tension of 34 mN/m or less, General formula (1)

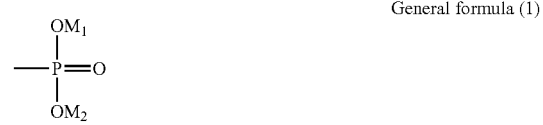

wherein $M_1$ and $M_2$ are, independently of each other, a hydrogen atom, alkali metal, ammonium or organic ammonium;

Hydrophilicity-hydrophobicity coefficient=[(Water activity of a 20% aqueous solution)−(Molar fraction of water in the 20% aqueous solution)]/[1− (Molar fraction of water in the 20% aqueous solution)]   (A).

13 Claims, 3 Drawing Sheets

U.S. PATENT DOCUMENTS

| | | |
|---|---|---|
| 4,653,940 A | 3/1987 | Katsukawa |
| 4,661,158 A | 4/1987 | Kobayashi et al. |
| 4,689,078 A | 8/1987 | Koike et al. |
| 4,702,742 A | 10/1987 | Iwata et al. |
| 4,723,129 A | 2/1988 | Endo et al. |
| 4,725,849 A | 2/1988 | Koike et al. |
| 4,740,796 A | 4/1988 | Endo et al. |
| 4,838,938 A | 6/1989 | Tomida et al. |
| 4,849,770 A | 7/1989 | Koike et al. |
| 4,853,036 A | 8/1989 | Koike et al. |
| 4,923,515 A | 5/1990 | Koike et al. |
| 4,957,553 A | 9/1990 | Koike et al. |
| 4,965,609 A | 10/1990 | Tomida et al. |
| 4,965,612 A | 10/1990 | Sakaki et al. |
| 4,969,951 A | 11/1990 | Koike et al. |
| 4,973,499 A | 11/1990 | Iwata et al. |
| 4,986,850 A | 1/1991 | Iwata et al. |
| 5,017,227 A | 5/1991 | Koike et al. |
| 5,053,078 A | 10/1991 | Koike et al. |
| 5,067,980 A | 11/1991 | Koike et al. |
| 5,075,699 A | 12/1991 | Koike et al. |
| 5,099,255 A | 3/1992 | Koike et al. |
| 5,101,217 A | 3/1992 | Iwata et al. |
| 5,118,351 A | 6/1992 | Shirota et al. |
| 5,124,718 A | 6/1992 | Koike et al. |
| 5,141,558 A | 8/1992 | Shirota et al. |
| 5,151,128 A | 9/1992 | Fukushima et al. |
| 5,190,581 A | 3/1993 | Fukushima et al. |
| 5,220,347 A | 6/1993 | Fukushima et al. |
| 5,221,333 A | 6/1993 | Shirota et al. |
| 5,248,991 A | 9/1993 | Shirota et al. |
| 5,250,121 A | 10/1993 | Yamamoto et al. |
| 5,254,157 A | 10/1993 | Koike et al. |
| 5,257,036 A | 10/1993 | Koike et al. |
| 5,258,066 A | 11/1993 | Kobayashi et al. |
| 5,296,022 A | 3/1994 | Kobayashi et al. |
| 5,329,305 A | 7/1994 | Fukushima et al. |
| 5,358,558 A | 10/1994 | Yamamoto et al. |
| 5,380,358 A | 1/1995 | Aoki et al. |
| 5,396,275 A | 3/1995 | Koike et al. |
| 5,468,553 A | 11/1995 | Koike et al. |
| 5,494,733 A | 2/1996 | Koike et al. |
| 5,500,023 A | 3/1996 | Koike et al. |
| 5,515,093 A | 5/1996 | Haruta et al. |
| 5,540,764 A | 7/1996 | Haruta et al. |
| 5,594,485 A | 1/1997 | Koike et al. |
| 5,645,631 A | 7/1997 | Koike et al. |
| 5,658,376 A | 8/1997 | Noguchi et al. |
| 5,686,951 A | 11/1997 | Koike et al. |
| 5,698,478 A | 12/1997 | Yamamoto et al. |
| 5,718,793 A | 2/1998 | Inamoto et al. |
| 5,764,261 A | 6/1998 | Koike et al. |
| 5,781,216 A | 7/1998 | Haruta et al. |
| 5,782,967 A | 7/1998 | Shirota et al. |
| 5,902,387 A | 5/1999 | Suzuki et al. |
| 5,922,625 A | 7/1999 | Haruta et al. |
| 5,976,233 A | 11/1999 | Osumi et al. |
| 6,033,066 A | 3/2000 | Koike et al. |
| 6,036,307 A | 3/2000 | Hakamada et al. |
| 6,139,939 A | 10/2000 | Haruta et al. |
| 6,214,963 B1 | 4/2001 | Noguchi et al. |
| 6,280,513 B1 | 8/2001 | Osumi et al. |
| 6,394,597 B1 | 5/2002 | Koike et al. |
| 6,398,355 B1 | 6/2002 | Shirota et al. |
| 6,426,766 B1 | 7/2002 | Shirota et al. |
| 6,474,803 B1 | 11/2002 | Shirota et al. |
| 6,552,156 B2 | 4/2003 | Noguchi et al. |
| 6,589,396 B2 | 7/2003 | Kuriyama et al. |
| 6,613,821 B2 | 9/2003 | Suzuki et al. |
| 6,619,791 B2 | 9/2003 | Tochihara et al. |
| 6,676,254 B2 | 1/2004 | Nagashima et al. |
| 6,698,876 B2 | 3/2004 | Sato et al. |
| 6,723,137 B1 | 4/2004 | Hakamada et al. |
| 6,776,886 B2 | 8/2004 | Kuriyama et al. |
| 6,874,881 B2 | 4/2005 | Shirota et al. |
| 6,964,700 B2* | 11/2005 | Uji et al. ............... 347/100 |
| 7,004,579 B2 | 2/2006 | Sato et al. |
| 7,029,109 B2 | 4/2006 | Shirota et al. |
| 7,055,943 B2 | 6/2006 | Suzuki et al. |
| 7,056,972 B2 | 6/2006 | Nakazawa et al. |
| 7,067,590 B2 | 6/2006 | Sato et al. |
| 7,141,105 B2 | 11/2006 | Udagawa et al. |
| 7,144,449 B2 | 12/2006 | Udagawa et al. |
| 7,151,156 B2 | 12/2006 | Sato et al. |
| 7,185,978 B2 | 3/2007 | Nagashima et al. |
| 7,306,664 B2 | 12/2007 | Kato et al. |
| 7,328,991 B2 | 2/2008 | Sato et al. |
| 7,423,075 B2 | 9/2008 | Ikegami et al. |
| 7,429,291 B2 | 9/2008 | Udagawa et al. |
| 7,439,282 B2 | 10/2008 | Sato et al. |
| 7,442,753 B2 | 10/2008 | Tsubaki et al. |
| 7,449,056 B2 | 11/2008 | Kato et al. |
| 7,449,513 B2 | 11/2008 | Sato et al. |
| 7,464,965 B2 | 12/2008 | Udagawa et al. |
| 7,498,364 B2 | 3/2009 | Sato et al. |
| 7,528,179 B2 | 5/2009 | Suda et al. |
| 7,538,147 B2 | 5/2009 | Sato et al. |
| 7,557,150 B2 | 7/2009 | Teshima et al. |
| 7,563,853 B2 | 7/2009 | Tsubaki et al. |
| 7,572,844 B2 | 8/2009 | Sato et al. |
| 7,598,332 B2 | 10/2009 | Ikegami et al. |
| 7,601,790 B2 | 10/2009 | Sato et al. |
| 7,611,570 B2 | 11/2009 | Koike et al. |
| 7,629,427 B2 | 12/2009 | Sato et al. |
| 7,641,723 B2 | 1/2010 | Koike et al. |
| 7,704,414 B2 | 4/2010 | Sato et al. |
| 7,866,806 B2 | 1/2011 | Sato et al. |
| 7,926,931 B2 | 4/2011 | Katsuragi et al. |
| 7,927,412 B2 | 4/2011 | Kuriyama et al. |
| 2005/0204957 A1* | 9/2005 | Momose et al. ............ 347/100 |
| 2006/0000386 A1* | 1/2006 | Hakamada et al. ........ 106/31.13 |
| 2006/0009544 A1 | 1/2006 | Miyagawa et al. |
| 2006/0169171 A1* | 8/2006 | Lee et al. ............... 106/31.6 |
| 2009/0078889 A1 | 3/2009 | Udagawa et al. |
| 2009/0311425 A1 | 12/2009 | Tsubaki et al. |
| 2010/0165019 A1 | 7/2010 | Koike et al. |
| 2010/0189902 A1 | 7/2010 | Koike et al. |
| 2010/0214351 A1 | 8/2010 | Koike et al. |

FOREIGN PATENT DOCUMENTS

| | | |
|---|---|---|
| JP | 11-010840 A | 1/1999 |
| JP | 2003-301129 A | 10/2003 |
| JP | 2004-195706 A | 7/2004 |
| JP | 2004209762 A * | 7/2004 |
| JP | 2006-037088 A | 2/2006 |
| JP | 2006-274023 A | 10/2006 |
| JP | 3-862441 B2 | 12/2006 |
| JP | 2007-302857 A | 11/2007 |
| WO | 2007/053564 A2 | 5/2007 |
| WO | 2007/132761 A1 | 11/2007 |

OTHER PUBLICATIONS

Apr. 13, 2010 International Search Report and Written Opinion in International Application No. PCT/JP2010/050655.

U.S. Appl. No. 13/132,438, filed Jun. 2, 2011, Okubo, et al.

* cited by examiner

FIRST INK

SECOND INK

INK JET RECORDING INK, INK JET IMAGE FORMING METHOD AND INK JET RECORDING APPARATUS

TECHNICAL FIELD

The present invention relates to an ink jet recording ink, an ink jet image forming method and an ink jet recording apparatus.

BACKGROUND ART

With the spread of an ink jet recording system, there is a demand for speeding up of recording and improvement in quality of recorded images such as letters and photographs when recording is conducted on plain paper according to the ink jet recording system.

For example, it is required to record official documents, photographic images of digital cameras, and various kinds of information published in homepages on both sides of a plain paper sheet at high speed. It is also required to achieve such clear image quality as in a recorded image obtained through recording with a laser beam printer. It is further required to achieve a high image density when letter images are printed and to provide sharp letter images without loosing letter shapes even when small letter images are printed.

For recorded images such as those of color photographs and tables, it is also required to inhibit bleeding at a color boundary portion, which is caused by contact of a plurality of recording inks of different colors with each other.

In order to meet such requirements, there have been proposed an ink having low permeability and making combined use of a specified salt and a self-dispersion pigment (Japanese Patent No. 3862441) and an ink containing at least a specified self-dispersion pigment, a humectant and a glycerol ether compound (Japanese Patent Application Laid-Open No. 2006-274023). There has also been proposed an ink which contains organic ultrafine particles having an average particle size of 0.5 μm or less and internally and three-dimensionally crosslinked and provides a high-density image with suppressed bleeding on plain paper (Japanese Patent Application Laid-Open No. 2004-195706). There has further been proposed an ink in which the content of a permeability-imparting agent in the ink is more increased than such a content of the permeability-imparting agent that the lowering of a surface tension of the resulting ink composition attending on increase in the content thereof is stopped (Japanese Patent Application Laid-Open No. 2003-301129). There has further been proposed an ink containing a self-dispersion pigment including phosphonic acid as a surface functional group (WO 2007/053564).

The present invention relates to an ink jet recording ink, an ink jet image forming method and an ink jet recording apparatus, which are suitable for use in forming a recorded image on plain paper. Objects to be achieved are shown below.
1) An ink is fixed on plain paper in a short time.
2) A recorded image has a high density and is clear.
3) A recorded image is inhibited from causing bleeding between inks.
4) A recorded image is inhibited from causing strike-through.
5) Even when small letters are printed, the letters are sharp without loosing their shapes.
6) A recorded image has good water resistance and fixability.

Japanese Patent No. 3862441 and Japanese Patent Application Laid-Open No. 2006-274023 describe the inks making combined use of a self-dispersion pigment having —$PO_3(M)_2$ (M being a hydrogen atom, alkali metal, ammonium or organic ammonium) as a functional group and various kinds of organic carboxylic acid salts. According to these inks, sufficient effects are achieved on the above-described objects 2) to 5), but the objects 1) and 6) may not be achieved in some cases.

According to the inks described in Japanese Patent Application Laid-Open Nos. 2004-195706 and 2003-301129, water resistance and inhibition of bleeding between two color inks are improved to some extent. However, these inks are not such that all the above 6 objects are satisfied, and in particular, problems are left on the objects that the density of the recorded image is made high, the strike-through of the recorded image is inhibited, and the small letters are beautifully printed. WO 2007/053564 proposes such an ink that color developability is improved by using a self-dispersion pigment including phosphonic acid as a surface functional group; however, the color developability in high-speed printing is insufficient in some cases.

Accordingly, it is an object of the present invention to provide an ink jet recording ink, an ink jet image forming method and an ink jet recording apparatus, which sufficiently satisfy the above objects 1) to 6) at the same time.

DISCLOSURE OF THE INVENTION

The above object can be achieved by the present invention described below. More specifically, the present invention provides an ink jet recording ink comprising a self-dispersion pigment to a surface of which an anionic functional group represented by the following general formula (1) is bonded directly or through another atomic group, an ammonium salt of an organic carboxylic acid, water, and a water-soluble compound having a hydrophilicity-hydrophobicity coefficient of 0.26 or more as defined by the following equation (A), the ink having a surface tension of 34 mN/m or less,

(1)

wherein $M_1$ and $M_2$ are, independently of each other, a hydrogen atom, alkali metal, ammonium or organic ammonium;

Hydrophilicity-hydrophobicity coefficient=[(Water activity of a 20% aqueous solution)−(Molar fraction of water in the 20% aqueous solution)]/[1−(Molar fraction of water in the 20% aqueous solution)]    (A)

The present invention also provides an ink jet image forming method for forming an image by applying the above-described ink to a recording medium with an ink jet recording system, wherein the ink is applied in a fixed amount of 0.5 pl or more and 6.0 pl or less, and wherein when the total amount of inks applied to a fundamental matrix for forming the image is 5.0 μl/cm² or less, and the duty of at least one ink of a color of the inks applied to the fundamental matrix is 80% duty or more, the application of the at least one ink to the fundamental matrix is conducted at plural timings, and the amount of the at least one ink applied at each timing is controlled to 0.7 μl/cm² or less.

The present invention further provides an ink jet recording apparatus equipped with a recording head for forming an image by applying the above-described ink to plain paper with an ink jet recording system, wherein the apparatus comprises a control mechanism for controlling the application of the ink such that the ink is applied in a fixed amount of 0.5 pl or more and 6.0 pl or less, and when the total amount of inks applied to a fundamental matrix for forming the image is 5.0 µl/cm² or less, and the duty of the at least one ink of a color of the inks applied to the fundamental matrix is 80% duty or more, the application of the at least one ink to the fundamental matrix is conducted at plural timings, and the amount of the at least one ink applied at each timing is controlled to 0.7 µl/cm² or less.

According to the present invention, fixing of an ink can be conducted in a short time when the ink is applied to plain paper. It is also possible to provide a clear and high-quality image having sufficient highlighter resistance, water resistance and image density with suppressed bleeding. Even when small letters are printed, the resulting letters are sharp and loss of letter shapes can be suppressed. It is further possible to form an image inhibited from causing strike-through and suitable for double-side printing. These are marked effects that are achieved by satisfying all the above-described constitutional requirements of the present invention and cannot be anticipated from the prior art.

Further features of the present invention will become apparent from the following description of exemplary embodiments with reference to the attached drawings.

BEST MODE FOR CARRYING OUT THE INVENTION

Figure 1:
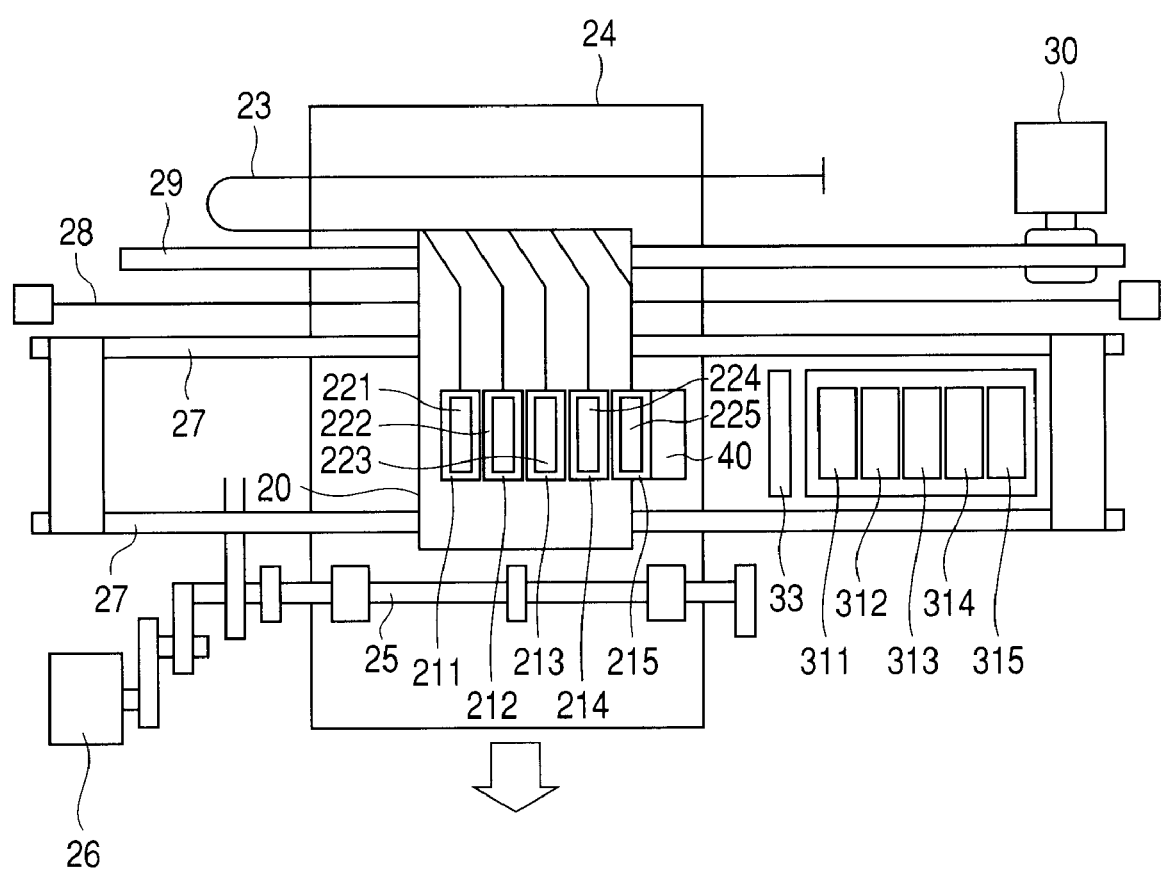
FIG. 1 is a front elevation schematically illustrating a serial type ink jet recording apparatus according to an embodiment, which can be applied to the present invention.

The present invention will hereinafter be described in more detail by favorable embodiments.
<Ink>
—Coloring Material—

An ink used in the present invention containing, as a coloring material, a self-dispersion pigment to a surface of which an anionic functional group represented by the following general formula (1) is bonded directly or through another atomic group,

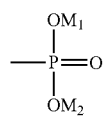

General formula (1)

wherein $M_1$ and $M_2$ are, independently of each other, a hydrogen atom, alkali metal, ammonium or organic ammonium.

The hydrophilic groups "$M_1$" and "$M_2$" in the general formula (1) are, independently of each other, a hydrogen atom, alkali metal, ammonium or organic ammonium. Specific examples of the alkali metal include Li, Na, K, Rb and Cs. Specific examples of the organic ammonium include methylammonium, dimethylammonium, trimethylammonium, ethylammonium, diethylammonium, triethylammonium, monohydroxymethyl(ethyl)amine, dihydroxymethyl(ethyl)amine and trihydroxymethyl(ethyl)amine. Among others, ammonium is particularly favorable. According to the kind of intended paper, it is favorable that $M_1$ and $M_2$ in the general formula (1) are an alkali metal and ammonium, respectively, and $M_1/M_2$ is 1/10 or more and 10/1 or less.

Examples of another atomic group interposed include linear or branched, substituted or unsubstituted alkylene groups having 1 to 12 carbon atoms, a substituted or unsubstituted phenylene group, and a substituted or unsubstituted naphthylene group. Examples of substituents on the alkylene, phenylene and naphthylene groups include a hydroxyl group, an amino group, and linear or branched alkyl groups having 1 to 6 carbon atoms. A self-dispersion pigments having a lactone group is favorably used in combination as a coloring material used in the ink, because uniformity in a high-duty portion becomes excellent according to the kind of paper used. The content ratio of the self-dispersion pigment to a surface of which an anionic functional group represented by the following general formula (1) is bonded directly or through another atomic group to the self-dispersion pigment having a lactone group is favorably 10:1 to 1:10 in terms of mass ratio.

When a common water-soluble dye is used as a coloring material, an image formed on a recording medium to the surface of which cellulose fiber is exposed, such as plain paper, is insufficient in water resistance.

When the self-dispersion pigment to a surface of which an anionic functional group represented by the following general formula (1) has been bonded directly or through another atomic group is used, however, the resulting image can have good water resistance. When compared with a pigment of the polymer dispersion type (a type using a polymer as a dispersant) that is another dispersion form of a water-dispersible pigment, the self-dispersion pigment is efficient in terms of the amount of the pigment component fixed to a surface portion of paper, because no dispersant is contained. Therefore, the self-dispersion pigment is considerably advantageous in color developability.

In the self-dispersion pigment according to the present invention, solid-liquid separation after the ink impacts on paper smoothly advances by a synergistic effect with the ammonium salt of organic carboxylic acids and the water-soluble compound used in combination, and so excellent results are achieved in color developability.

As self-dispersion pigments, pigments having surface-modifying groups of only other functional groups, for example, a sulfonic group (or a salt thereof) or a carboxyl group (or a salt thereof) are known. When these conventional general self-dispersion pigments are compared with the self-dispersion pigment in the present invention, the self-dispersion pigment in the present invention is strong in power for hiding a sizing agent scatteringly presents in the surface of plain paper. Accordingly, an outstanding effect is observed in prevention of the so-called blank area phenomenon at a solid-printed portion (100% duty portion).

As described above, the self-dispersion pigment in the present invention is a pigment which is obtained by imparting self-dispersibility to a pigment by a treatment of introducing the group represented by the general formula (1) into the surface of the pigment directly or through another atomic group, and does not essentially require a dispersant in general. Here, the amount of treating pigment particles is favorably 100 to 5,000 µmol/g, more favorably 300 to 2,500 µmol/ g. If the amount is less than 100 µmol/g, the pigment treated is not stably dispersed in an aqueous solution, and the pigment precipitates, and so an ink containing such a pigment may lack reliability as the ink in some cases.

As a pigment used in a black ink, carbon black is favorably used. Examples of carbon black include carbon black pigments such as furnace black, lamp black, acetylene black and channel black. Such a carbon black pigment favorably has the following characteristics: the primary particle size is 15 nm or more and 40 nm or less; the specific surface area is 50 $m^2/g$ or more and 400 $m^2/g$ or less as determined according to the BET method; the DBP oil absorption is 40 ml/100 g or more and 200 ml/100 g or less; and the volatile matter content is 0.5% by weight or more and 10% by weight or less.

As pigments used in color inks, organic pigments are favorably used. As specific examples thereof, may be mentioned the following pigments: insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; thioindigo pigments; condensed azo pigments; diketopyrrolopyrrole pigments; and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

When organic pigments are indicated by COLOR INDEX (C.I.) numbers, the following pigments may be exemplified. C.I. Pigment Yellow: 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180 and 185; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown: 23, 25 and 26. Among these pigments, the following pigments are more favorable. C.I. Pigment Yellow: 13, 17, 55, 74, 93, 97, 98, 110, 128, 139, 147, 150, 151, 154, 155, 180 and 185 as yellow pigments; C.I. Pigment Red: 122, 202 and 209, and C.I. Pigment Violet 19 as magenta pigments; and C.I. Pigment Blue: 15:3 and 15:4 as cyan pigments. Needless to say, other pigments than the above-mentioned pigments may also be used.

The average particle size of the self-dispersion pigment used in the present invention is favorably 60 nm or more, more favorably 70 nm or more, still more favorably 75 nm or more. The average particle size is favorably 145 nm or less, more favorably 140 nm or less, still more favorably 130 nm or less. In terms of a method for measuring the average particle size, the average particle size can be measured by means of FPAR-1000 (manufactured by Otsuka Electronics Co., Ltd.) or Nanotrac UPA 150EX (manufactured by NIKKISO CO., LTD.) utilizing scattering of laser beam. (In Nanotrac UPA, the average particle size is measured as a 50% cumulative value). Incidentally, the average particle size is defined as a scattering average particle size in the present invention.

Two or more pigments may be used in combination in the same ink as needed.

The amount of the above-described self-dispersion pigment added into an ink is favorably 0.5% by weight or more, more favorably 1% by weight or more, still more favorably 2% by weight or more, based on the total weight of the ink. The amount is favorably 15% by weight or less, more favorably 10% by weight or less, still more favorably 8% by weight or less.

(Ammonium Salt of Organic Carboxylic Acid)

The ink used in the present invention contains an ammonium salt of an organic carboxylic acid. The above-described self-dispersion pigment is easy to cause solid-liquid separation after impacted on paper compared with the conventional self-dispersion pigment. The solid-liquid separation is particularly promoted by using the ammonium salt of the organic carboxylic acid in combination. As a result, the pigment is fixed to the surface layer of the paper, which can contribute to prevention of bleeding and high color development. In addition, power for hiding a sizing agent scatteringly present in the surface of plain paper is strengthened, and so an outstanding effect is observed in prevention of the so-called blank area phenomenon at a solid-recorded portion. These effects are remarkably exhibited in high-speed printing.

No particular limitation is imposed on the ammonium salt of the organic carboxylic acid so far as it is an ammonium salt of a carboxylic acid with 1 to 3 carboxyl groups bonded to a skeleton having carbon atom(s). Specific examples of the carboxylic acid include citric acid, succinic acid, benzoic acid, acetic acid, phthalic acid, oxalic acid, tartaric acid, gluconic acid, tartronic acid, maleic acid, malonic acid, adipic acid and derivatives thereof. Among others, these having at least one carboxyl group exhibiting a pKa value of 2.5 or more and 5.5 or less as an acid form are more favorable.

The amount of the ammonium salt of the organic carboxylic acid added into the ink is favorably 0.05% by mass or more, more favorably 0.1% by mass or more, still more favorably 0.2% by mass or more. The amount is favorably 3% by mass or less, more favorably 2% by mass or less, still more favorably 1% by mass or less.

—Aqueous Medium—

The ink according to the present invention contains water as an essential component, and the content of water in the ink is favorably 30% by mass or more based on the total mass of the ink. The content is favorably 95% by mass or less. In addition to water, a water-soluble compound is allowed to be contained to provide an aqueous medium. The water-soluble compound is miscible with water without undergoing phase separation from water in the form of a 20% by mass mixed liquid with water and is high in hydrophilicity. Any water-soluble compound easy to evaporate is not favorable from the viewpoints of solid-liquid separation and the prevention of clogging, and a substance having a vapor pressure of 0.04 mmHg or less at 20° C. is favorable.

The ink according to the present invention contains, as an essential component, a water-soluble compound having a hydrophilicity-hydrophobicity coefficient of 0.26 or more as defined by the following equation (A). According to a recording medium used, an ink containing a water-soluble compound having a hydrophilicity-hydrophobicity coefficient of 0.26 or more and 0.37 or less as defined by the equation (A) and a water-soluble compound having a hydrophilicity-hydrophobicity coefficient of 0.37 or more is favorable because printing characteristics for small letters are improved. According to a recording medium used, it may be more favorable in some cases to contain a water-soluble compound having a hydrophilicity-hydrophobicity coefficient of from 0.26 or more to 0.37 or less and two or more water-soluble compounds each having a hydrophilicity-hydrophobicity coefficient of 0.37 or more, since printing characteristics for small letters are improved. The reason for it is considered to be as follows. The water-soluble compound having a hydrophilicity-hydrophobicity coefficient of 0.37 or more shows a comparatively small affinity for water, the self-dispersion pigment and cellulose fibers after the ink impacts on paper, and so the compound have the role of strongly promoting solid-liquid separation of the self-dispersion pigment. Therefore, the above-described effect is exhibited according to the recording medium used.

Hydrophilicity-hydrophobicity coefficient=[(Water activity of a 20% aqueous solution)−(Molar fraction of water in the 20% aqueous solution)]/[1−(Molar fraction of water in the 20% aqueous solution)]  (A)

The water activity in the equation is represented by [Water activity=(Water vapor pressure of an aqueous solution)/(Water vapor pressure of pure water)]. Various methods are present as methods for measuring the water activity. Although the method is not limited to any method, a chilled mirror dew point measuring method among others is suitable for use in measurement of materials used in the present invention. The values in the present description are obtained by subjecting a 20% aqueous solution of each water-soluble compound to measurement at 25° C. by means of AQUALOVE CX-3TE (manufactured by DECAGON Co.) according to this measuring method.

According to the Raoult's Law, a rate of vapor pressure depression of a dilute solution is equal to a molar fraction of a solute and has no connection with the kinds of a solvent and a solute, so that the molar fraction of water in an aqueous solution is equal to the water activity. However, when water activities of aqueous solutions of various water-soluble compounds are measured, the water activities do often not consist with the molar fraction of water.

When the water activity of an aqueous solution is lower than the molar fraction of water, the water vapor pressure of the aqueous solution comes to be smaller than the theoretical calculated value, and evaporation of water is inhibited by presence of a solute. From this fact, it is found that the solute is a substance great in hydration force. When the water activity of an aqueous solution is higher than the molar fraction of water to the contrary, a solute is considered to be a substance small in hydration force.

The present inventors have paid attention to the feature that the degree of hydrophilicity or hydrophobicity of a water-soluble compound contained in an ink greatly affects the promotion of solid-liquid separation between a self-dispersion pigment and an aqueous medium and the performance of various inks. From this feature, the hydrophilicity-hydrophobicity coefficient represented by the equation (A) has been defined. The water activity is measured on aqueous solutions of various water-soluble compounds at a fixed concentration of 20% by mass. The degree of hydrophilicity or hydrophobicity between various solutes can be relatively compared by conversion to the equation (A) even when the molecular weights of the solutes and the molar fractions of water are different. Since the water activity of an aqueous solution does not exceed 1, the maximum value of the hydrophilicity-hydrophobicity coefficient is 1.

The hydrophilicity-hydrophobicity coefficients of water-soluble compounds, which are obtained according to the equation (A), are shown in Table 1. However, the water-soluble compounds of the present invention are not limited only to these compounds.

TABLE 1

| Substance name | Hydrophilicity-hydrophobicity coefficient |
|---|---|
| 1,2-Hexanediol | 0.97 |
| 1,2-Pentanediol | 0.93 |
| 3-Methyl-1,3-butanediol | 0.90 |
| 1,2-Butanediol | 0.90 |
| 2,4-Pentanediol | 0.88 |
| 1,6-Hexanediol | 0.76 |
| 1,7-Heptanediol | 0.73 |
| 3-Methyl-1,5-pentanediol | 0.54 |
| 1,5-Pentanediol | 0.41 |
| Trimethylolpropane | 0.31 |
| Ethyleneurea | 0.30 |
| 1,2,6-Hexanetriol | 0.28 |
| 1,2,3-Butanetriol | 0.22 |
| Sorbitol | 0.21 |
| Urea | 0.20 |
| Diethylene glycol | 0.15 |
| 1,2,4-Butanetriol | 0.15 |
| Glycerol | 0.11 |
| Diglycerol | 0.08 |
| Triethylene glycol | 0.07 |
| Polyethylene glycol 200 | −0.09 |
| Polyethylene glycol 600 | −0.43 |

As the water-soluble compound, a water-soluble compound having the intended hydrophilicity-hydrophobicity coefficient can be selected for use from among various kinds of water-soluble compounds having suitability for ink jet recording inks.

The present inventors have carried out an investigation as to the relationship between water-soluble compound(s) contained in the ink and printing characteristics for small letters, such as bleeding and dot gain, in the ink jet image forming method according to the present invention. As a result, it has been found that when a water-soluble compound having a hydrophilicity-hydrophobicity coefficient of 0.26 or more and having a low hydrophilic tendency is used in the ink containing the self-dispersion pigment and the ammonium salt of the organic carboxylic acid according to the present invention, the above-mentioned characteristics are extremely improved. Among others, compounds having such a glycol structure that the number of carbon atoms unsubstituted on a hydrophilic group in the glycol structure is more than the number of carbon atoms substituted on the hydrophilic group were particularly favorable. It is considered that these water-soluble compounds are comparatively small in affinity for water, the self-dispersion pigment and cellulose fibers after the ink impacts on paper, and so the compounds have the role of strongly promoting solid-liquid separation of the self-dispersion pigment.

When the water-soluble compound having a hydrophilicity-hydrophobicity coefficient of 0.26 or more is used singly, trimethylolpropane is particularly favorable. When the water-soluble compound having a hydrophilicity-hydrophobicity coefficient of 0.37 or more is used in combination, diols having 4 to 7 carbon atoms, such as hexanediol, pentanediol and butanediol, are favorable as such water-soluble compounds. Diols having 6 carbon atoms are more favorable, with 1,2-hexanediol and 1,6-hexanediol being particularly favorable. With respect to the mixing ratio when 2 or more water-soluble compounds having a hydrophilicity-hydrophobicity coefficient of 0.37 or more are allowed to be contained, 1,2-hexanediol and 1,6-hexanediol are favorably used at a ratio of from 1/10 to 10/1. 1,2-Hexanediol and 1,6-hexanediol are more favorably used at a ratio of from 1/5 to 5/1. When 2 or more water-soluble compounds having a hydrophilicity-hydrophobicity coefficient of 0.37 or more are used, the difference between the hydrophilicity-hydrophobicity coefficients thereof is favorably 0.1 or more.

The total content of the water-soluble compound(s) in the ink is favorably 5% by mass or more, more favorably 6% by mass or more, still more favorably 7% by mass. The total content is favorably 40% by mass or less, more favorably 35% by mass or less, still more favorably 30% by mass or less. When 2 or more water-soluble compounds having a hydrophilicity-hydrophobicity coefficient of 0.37 or more are used in combination, the total content of the water-soluble compounds is favorably 3% by mass or more, more favorably 5% by mass or more.

—Surfactant—

The ink used in the present invention favorably contains a surfactant for achieving ejection stability with good balance. In particular, the ink favorably contains a nonionic surfactant. Among nonionic surfactants, polyoxyethylene alkyl ethers and ethylene oxide adducts of acetylene glycol are particularly favorable. The HLB (hydrophile-lipophile balance) values of these nonionic surfactants are 10 or more. The content of the surfactant used in the ink in combination is favorably 0.1% by mass or more, more favorably 0.3% by mass or more, still more favorably 0.5% by mass or more. The content is favorably 5% by mass or less, more favorably 4% by mass or less, still more favorably 3% by mass or less.

—Other Additives—

Besides the above-described components, a viscosity modifier, an antifoaming agent, a preservative, a mildew-proofing agent, an antioxidant and a penetrant may be added as additives to the ink according to the present invention, as needed, to provide the ink as an ink having desired physical property values.

—Surface Tension—

The surface tension of the ink used in the present invention is 34 mN/m or less. The surface tension of the ink is favorably 33 mN/m or less, more favorably 32 mN/m or less. The surface tension is favorably 27 mN/m or more, more favorably 28 mN/m or more, still more favorably 29 mN/m. The surface tension of the ink is controlled within this range, thereby fully exhibiting the effects of the ink. Incidentally, the surface tension is a value measured by the vertical plate method, and CBVP-Z (manufactured by Kyowa Interface Science Co., Ltd.) is mentioned as a specific measuring apparatus.

Since glossy paper and mat paper that are exclusive paper for ink jet have a porous ink receiving layer formed on the surface of paper unlike plain paper, such paper is scarcely affected by the surface tension of an ink so that permeation of the ink quickly progresses.

However, a sizing agent having a water-repellent effect is internally and/or externally added to plain paper, so that the permeation of an ink is often inhibited. In other words, the plain paper has a lower critical surface tension, which is an index as to whether the surface can be rapidly wetted with the ink or not, than the exclusive paper for ink jet.

When the surface tension of the ink is higher than 34 mN/m, such surface tension is higher than the critical surface tension of the plain paper, so that the plain paper is not immediately wetted even when the ink impacts the paper, and permeation of the ink is not rapidly started.

When the surface tension of the ink is high, such an ink is hard to be fixed in a short time even when wettability with paper is somewhat improved to lower the contact angle between the ink and the paper. Further, such an ink tends to deteriorate the fixability thereof. When the surface tension of the ink is 34 mN/m or less, pore absorption is mainly caused. When the surface tension of the ink is higher than 34 mN/m, fiber absorption is mainly caused. With respect to the absorption rate of an ink into paper by absorption of these two types, the pore absorption is overwhelmingly faster. Thus, an ink that mainly causes pore absorption is provided in the present invention, thereby realizing high-speed fixing.

—Viscosity—

The viscosity of the ink used in the present invention is favorably 6.0 mPa·s or less. When an ink jet recording apparatus in which ink jet recording is conducted by utilizing thermal energy is used, the feed of the ink to a nozzle may not be in time in some cases to record an unclear image when the viscosity is higher than the above viscosity. The viscosity of the ink is more favorably 5.0 mPa·s or less, still more favorably 4.0 mPa·s or less.

<Recording Method>

In the recording method of the present invention, the volume of the ink droplet applied at a time is controlled to a fixed amount of 0.5 pl or more and 6.0 pl or less. The amount is favorably 1.0 pl or more, more favorably 1.5 pl or more. The amount is also favorably 5.0 pl or less, more favorably 4.5 pl or less. Any amount less than 0.5 pl is not favorable because an image poor in fixability and water resistance may be provided in some cases. If the amount exceeds 6.0 pl, letters printed may loose their shapes by dot gain in some cases when small letters of the order of from 2 point (1 point≈0.35 mm) to 5 point are printed.

Since the volume of the ink ejected greatly affects the strike-through of the ink, the volume is important even from the viewpoint of application to double-side printing. Pores of the size of from 0.1 μm to 100 μm with the size of 0.5 μm to 5.0 μm as the center are generally distributed in plain paper. Incidentally, the plain paper in the present invention means paper for copying used in a large amount in printers and copying machines, such as commercially available wood free paper, wood-containing paper and PPC paper, or bond paper. The permeation phenomenon of an aqueous ink into the plain paper is generally classified into the fiber absorption that the ink is directly absorbed and permeated into the cellulose fiber itself of the plain paper and the pore absorption that the ink is absorbed and permeated into pores formed between cellulose fibers. The ink used in the present invention is an ink that mainly permeates by the pore absorption. Therefore, when the ink used in the present invention is applied to the plain paper and a part of the ink comes into contact with largish pores of about 10 μm or more, which are present in the surface of the plain paper, the ink is concentrated in the largish pores according to the Lucas-Washburn equation and absorbed to permeate the paper. As a result, at this portion, the ink particularly deeply permeates the paper, which is extremely disadvantageous to development of high color developing on the plain paper. On the other hand, as the volume of an ink droplet becomes smaller, the contact probability of one ink droplet with the largish pore becomes lower, so that the ink is not easily concentrated and absorbed in the largish pore. Further, even if the ink droplet comes into contact with the largish pore, the amount of the ink to deeply permeate may be small so far as the ink is small. As a result, an image having high color developing is provided on the plain paper.

The fixed amount of the ink in the present invention means the same volume of ink ejected in a state that the structures of nozzles making up a recording head are not varied among the nozzles and the setting of changing drive energy to be applied is not made. Namely, in such a state, the volume of the ink applied is fixed even if ejection is somewhat varied by an error in production of apparatus. The volume of the ink applied is made fixed, whereby the permeation depth of the ink is stabilized, the image density of a recorded image becomes high, and image uniformity is improved. On the contrary, according to a system in which the volume of an ink droplet applied is changed, variation in permeation depth of the ink droplet becomes great, because the volume of the ink is not fixed and inks different in volume mixedly exist. In a high duty portion of a recorded image in particular, the image uniformity is deteriorated because a portion low in image density exists in the recorded image due to the great variation in permeation depth to plain paper.

As a system suitable for applying an ink in a fixed amount, a thermal ink jet system in which the ink is applied by the action of thermal energy is favorable from the viewpoint of ejection mechanism. More specifically, according to the thermal ink jet system, the variation in permeation depth of the ink is suppressed, and the resulting recorded image is high in image density and good in uniformity. In addition, the thermal ink jet system is suitable for forming a recording head of a multi-nozzle and high-density type compared with a system in which an ink is applied by using piezoelectric elements and is also favorable for high-speed recording.

The object of the recording method of the present invention is required when an image in which the duty of at least one ink of a color is 80% duty or more is formed in a fundamental matrix for forming the image. The minimum portion for calculating the duty is 50 µm×50 µm. The image with a duty of 80% or more is an image formed by applying the ink to 80% or more of the lattices in the matrix of the portion for calculating the duty. The size of lattices is determined by the resolution of the fundamental matrix. For example, when the resolution of the fundamental matrix is 1,200 dpi×1,200 dpi, the size of a lattice is $\frac{1}{1,200}$ inch×$\frac{1}{1,200}$ inch.

The image with a duty of at least one ink of a color of 80% duty or more in the fundamental matrix will be described. Incidentally, "a color" in the present invention is favorably exactly of the same color or color tone. However, if there is some difference in density, such case is also defined as "a color". In other words, when 4 color inks of black, cyan, magenta and yellow are used, the image means an image having a portion where the duty becomes 80% or more with at least one of these inks in the fundamental matrix. On the other hand, an image having no portion where the duty of an ink of a color is 80% or more in the fundamental matrix has a relatively little overlapping between inks which have impacted and may not cause problems of loss of letter shapes and bleeding in many cases even when a printing process is not modified. The present invention develops a marked effect on the problems caused by applying an ink of a color in plenty to a fundamental matrix. Therefore, the fundamental matrix, from which the duty is calculated out, is defined as a fundamental matrix of each color, i.e., ink of a color.

The fundamental matrix of the present invention can be freely set by a recording apparatus. The resolution of the fundamental matrix is favorably 600 dpi or more, more favorably 1,200 dpi or more. The resolution is also favorably 4,800 dpi or less, since the resolution exceeding 4,800 dpi may cause deterioration of the image and letter qualities due to the increased amount of applied ink. The resolutions in the vertical and horizontal directions of the fundamental matrix may be the same or different so far as they fall within this range.

The recording method of the present invention is also required in the case of forming an image in which the total amount of ink(s) applied to the fundamental matrix is 5.0 µl/cm² or less. In other words, when 4 color inks of black, cyan, magenta and yellow are used, the total amount is the amount of all these inks applied. When a single ink, for example, a black color ink is used, the total amount is the amount of the black ink applied. The portion for calculating the total amount of the ink(s) applied is the same as the portion for calculating the duty. If an image having a portion where the total amount of all the color inks applied exceeds 5.0 µl/cm² is formed, in some cases, a clear image may not be obtained, or strike-through may occur, which is unsuitable for double-side printing.

In the present invention, the application of the ink of one color is dividedly conducted at plural timings when such an image as described above is formed. In the present invention, when several drops of the ink are applied at the same time from one nozzle row to the fundamental matrix, such application is defined as one timing. The one nozzle row means a group of nozzles that ejects the same kind of ink. The reason for it is based on the fact that there is a particular difference in performance between non-divided application and divided application. The number of divisions of the application is at least 2 or more. When the number of divisions of the application is 3 or more, the density of the resulting recorded image becomes high, and the color developability thereof is good. The number of divisions of the application is favorably 8 or less, more favorably 4 or less. If the number of divisions of divided application exceeds 8, there is a tendency to lower the covering rate of the ink on the surface of plain paper to deteriorate color developability though such application is effective for inhibition of bleeding and good printing of small letters.

A method for dividing application of an ink into 2 or more is generally classified into a serial type and a line type. Taking the serial type as an example, when for example, solid printing is conducted with 2 divisions of application, a recording head passes 2 times (2-pass) through a recording medium. Upon the divided application, the amounts of the ink applied per application are often equal. However, the amounts are not limited thereto in the present invention. An arrangement example of the impact positions of dots, in the case where upon 2-pass printing, an ink corresponding to 50% is applied at the first pass to a recording medium, and the remaining ink corresponding to 50% is then applied at the second pass to the recording medium to conduct 100% solid printing is illustrated in FIG. 4.

Figure 3:
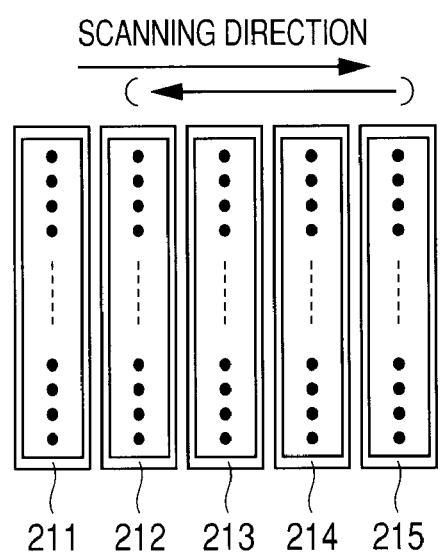
FIG. 3 illustrates the construction of a recording heads applicable to an embodiment of the present invention.
Figure 4:
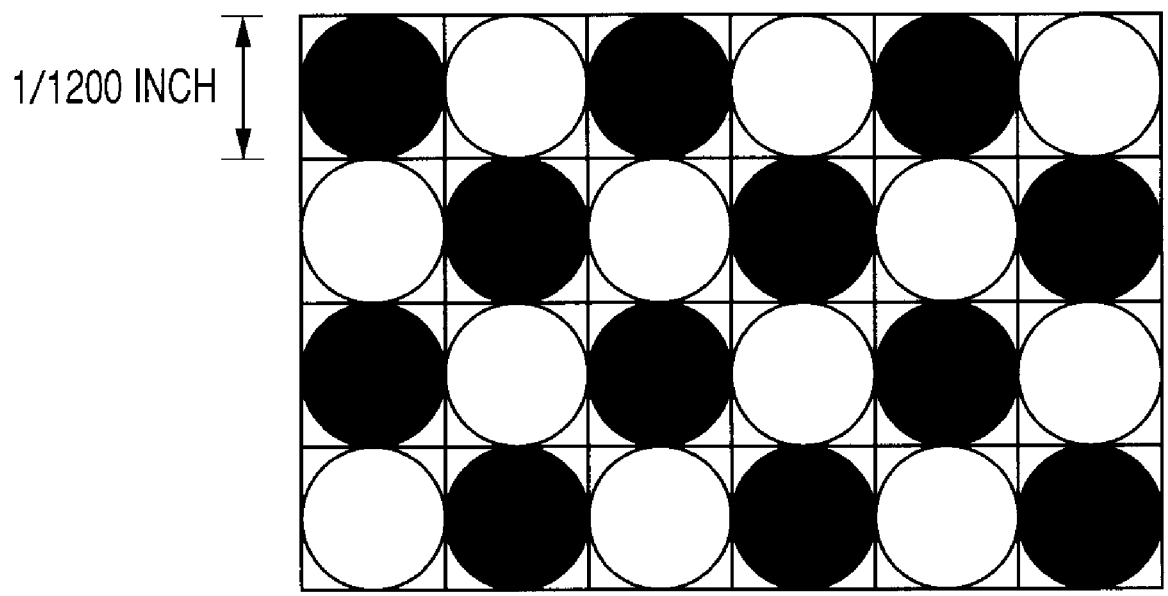
FIG. 4 illustrates an exemplary method for forming recording dots.
Figure 4:
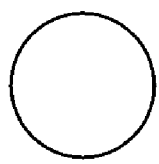
Figure 4:
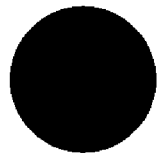

In addition to the serial type divided application method, the present invention can also be applied to a line type in which dots are applied by 2 divisions in 1-pass to the same positions as in FIG. 4. As an embodiment of the construction that, for example, a black ink is applied by 2 divisions in 1-pass, is mentioned an example where a recording head illustrated in FIG. 3 is used. Regarding a construction example of heads for color inks, nozzle rows 211, 212, 213, 214 and 215 are constructed so as to eject black (K), cyan (C), magenta (M), yellow (Y) and black (K) inks, respectively. This example is a construction example in the case of applying the black ink at substantially one pass by divided 2 nozzle rows. Similarly, the number of nozzle rows in a head or the number of inks mounted is changed, whereby various inks can be applied at substantially one pass by divided 2 or more nozzle rows.

The amount of the ink of a color applied at each timing is controlled to 0.7 µl/cm² or less, favorably 0.6 µl/cm² or less, more favorably 0.5 µl/cm² or less. If the amount of the ink of a color applied at each timing exceeds 0.7 µl/cm², strike-through, loss of letter shapes and/or bleeding may occur in some cases.

The reason why the application of the ink of a color at plural timings upon the formation of such an image is an essential requirement in the present invention is described. This is based on the fact that there is a particular difference in performance between the case of applying the ink at plural timings and the case of applying the ink at a time.

In the present invention, the time of application of the ink of one color to the fundamental matrix is within the range of 1 msec or more and 200 msec or less. In other words, the ink is favorably applied at plural timings within this range to complete an image. Printing is conducted under such conditions, whereby improvement in color developability and quality of small letters is observed. The control to 1 msec or more is favorable because there is a certain period of time between the first application of the ink and the last application of the ink. The reason for it is considered to be as follows. When the last ink droplet impacts before the first ink droplet is sufficiently fixed to plain paper, the respective ink droplets bond to each other to form a large droplet (beading). The large ink droplet permeates deeply from a largish pore on plain paper, so that color developability can be lowered. The large ink droplet also spreads laterally along the direction of fibers in the plain paper, so that sharpness of letters can be lost. It can thereby take a sufficient time to undergo solid-liquid separation after an ink droplet impacts on a recording medium to improve an image density and letter quality.

When application of the ink of a color to the fundamental matrix is conducted at 3 or more timings, the time interval between the respective timings is favorably controlled to 1 msec or more. Recording is conducted under such conditions, thereby alleviating lowering of the image density and deterioration of letter quality, which are caused by bonding of the respective ink droplets to each other.

Even if application of the ink of a color to the fundamental matrix is conducted at a time longer than 200 msec, the effect is not so changed compared with the effect when setting the time to 200 msec. Therefore, the preferable upper limit is defined as 200 msec in the present invention to achieve high-speed printing. The application of the ink of a color to the fundamental matrix is preferably conducted at 1 msec or more, favorably 4 msec or more, more favorably 8 msec or more, still more favorably 12 msec or more. The time of application of the ink of a color to the fundamental matrix is set as described above, whereby the effect of the ink used in the present invention can be fully achieved. In other words, a high-image density and high-quality image can be obtained, and high-speed ink jet recording is realized. Incidentally, the application of the ink of a color to the fundamental matrix is favorably conducted by a plurality of nozzle rows in the same recording head in all timings for achieving such timings of application.

<Ink Jet Recording Apparatus>

The ink jet recording apparatus according to the present invention is then described. The ink jet recording apparatus according to the present invention is an apparatus equipped with a recording head for applying an ink in a fixed amount of 0.5 pl or more and 6 pl or less. The recording head of the ink jet recording apparatus according to the present invention is favorably a recording head in which thermal energy is caused to act on an ink to apply the ink. Such a recording head is suitable for forming nozzles at a high density compared with a recording head that an ink is ejected by using a piezoelectric element. In addition, such recording head is excellent in applying the ink in a fixed amount and thus excellent in that variation in permeation depth of the ink is reduced and the uniformity of the resulting recorded image is made good.

With respect to the typical construction and principle of the recording head in which thermal energy is caused to act on the ink to apply the ink, those using the basic principle disclosed in, for example, U.S. Pat. Nos. 4,723,129 and 4,740,796 are favorable. This system may be applied to any of the so-called On-Demand type and continuous type. In particular, the On-Demand type is advantageous. In the case of the On-Demand type, at least one driving signal, which corresponds to recording information and gives a rapid temperature rise exceeding nuclear boiling, is applied to an electrothermal converter arranged corresponding to a sheet or a liquid path, in which an ink is retained, thereby causing the electrothermal converter to generate thermal energy to cause film boiling on the heat-acting surface of a recording head. As a result, a bubble can be formed in the ink in response to the driving signal in relation of one to one. The ink is ejected through an ejection opening by the growth-contraction of this bubble to form at least one droplet. When the driving signal is applied in the form of a pulse, the growth-contraction of the bubble is suitably conducted in a moment, so that the amount of the ink ejected is fixed, and the ejection of the ink, which is also excellent in responsiveness, can be achieved. It is therefore favorable to use such pulsed signals.

FIG. 1 is a front elevation schematically illustrating an ink jet recording apparatus according to an embodiment of the present invention. A recording head, which conducts ejection by an ink jet recording system, is mounted on a carriage 20. The recording head has nozzle rows 211 to 215 as a plurality of nozzle rows. As an embodiment of the construction that a black ink is applied by 2 divisions in 1-pass, is mentioned an embodiment in which ink ejection orifices 211, 212, 213, 214 and 215 eject black (K), cyan (C), magenta (M), yellow (Y) and black (K) inks, respectively.

Ink cartridges 221 to 225 are respectively constructed by the recording head, nozzle rows 211 to 215 and ink tanks for feeding inks to these orifices.

A concentration sensor 40 is provided. The concentration sensor 40 is a reflection type concentration sensor and is so constructed that the density of a test pattern recorded on a recording medium can be detected in a state of being provided on a side surface of the carriage 20.

Control signals to the recording head are transferred through a flexible cable 23.

A recording medium 24, to the surface of which cellulose fiber is exposed, such as plain paper, is held by discharge rollers 25 via conveyance rollers (not illustrated) and conveyed in a direction (secondary scanning direction) of the arrow by driving a conveyance motor 26.

The carriage 20 is guided and supported by a guide shaft 27 and a linear encoder 28. The carriage 20 is reciprocatingly moved in a main scanning direction along the guide shaft 27 through a drive belt 29 by driving a carriage motor 30.

A heating element (electricity-thermal energy converter) for generating thermal energy for ink ejection is provided in the interior (liquid path) of the recording head. The heating element is driven based on a recording signal in accordance with the reading timing of the linear encoder 28 to eject and apply ink droplets on to the recording medium, thereby forming an image.

A recovery unit 32 having cap parts 311 to 315 is provided at a home position of the carriage 20 arranged outside a recording region. When recording is not conducted, the carriage 20 is moved to the home position, and the nozzle rows 211 to 215 are closed by their corresponding caps 311 to 315, whereby sticking of the inks caused by evaporation of ink solvents or clogging by adhesion of foreign matter such as dust can be prevented. The capping function of the cap parts is also utilized for solving ejection failure or clogging of ink ejection orifices of low recording frequency. Specifically, the capping parts are utilized for blank ejection for preventing ejection failure, in which the inks are ejected to the cap parts located in a state of being separated from the ink ejection orifices. Further, the cap parts are utilized for sucking the inks from the ink ejection orifices in a capped state by a pump (not illustrated) to recover ejection of ejection orifices undergone ejection failure.

An ink receiving part 33 plays the role of receiving ink droplets preliminarily ejected when the recording head passes through over it just before recording operation. A blade or wiping member (not illustrated) is arranged at a position adjoining the cap parts, whereby faces forming the nozzle rows 211 to 215 can be cleaned.

As described above, it is favorable to add the recovery unit for the recording head and preliminary units to the construction of the recording apparatus because the recording operation can be more stabilized. Specific examples of these units include capping units, cleaning units and pressurizing or sucking units for the recording head, and preliminary heating units by electrothermal converters, other heating elements than these converters or combinations thereof. It is also effective for stably conducting recording to provide a preliminary ejection mode to conduct ejection other than that for recording.

In addition, a cartridge type recording head in which ink tanks are provided integrally with the recording head itself described in the above-described embodiment may also be used. Further, a replaceable chip type recording head in which electrical connection to an apparatus body and the feed of inks from the apparatus body become feasible by installing it in the apparatus body may also be used.

FIG. 3 illustrates the construction of the recording head having the nozzle rows 211 to 215. In the drawing, the recording scan directions of the recording head are directions indicated by the arrows. The nozzle rows 211 to 215 each composed of a plurality of nozzles arranged in a direction substantially perpendicular to the recording scan direction are provided in the recording head. The recording head ejects ink droplets at a predetermined timing from the respective ejection orifices while being moved and scanned in the recording scan direction in the drawing, whereby an image is formed on a recording medium at a recording resolution according to the arrangement density of the nozzles. At this time, the recording head may conduct recording operation in any direction of the recording scan directions. The recording operation may be conducted in any direction of the forward and return directions.

Figure 2:
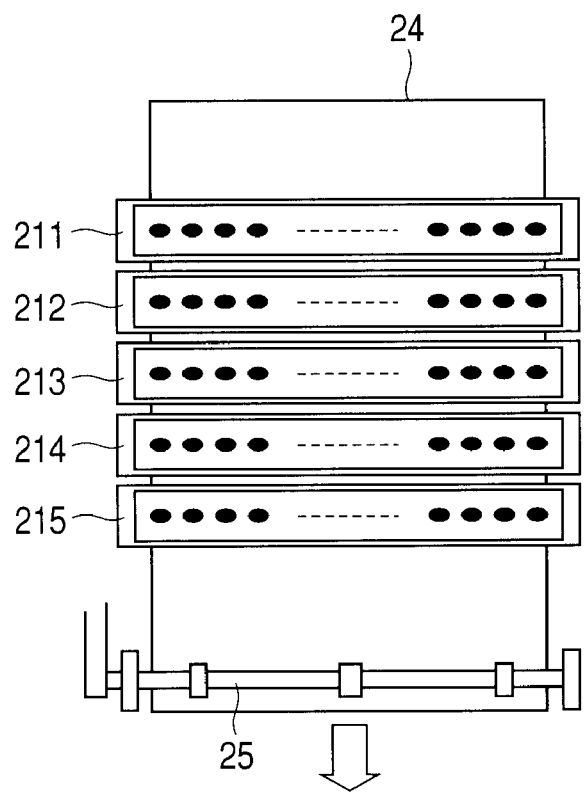
FIG. 2 is a front elevation schematically illustrating a line type ink jet recording apparatus according to an embodiment, which can be applied to the present invention.

The above-described embodiment is directed to a recording apparatus of a serial type in which the recording head is scanned to conduct recording. However, a recording apparatus of a full-line type in which a recording head having a length corresponding to the width of a recording medium is used may also be used. As the recording head of the full-line type, is mentioned such a construction that such recording heads of the serial type as disclosed in FIG. 3 are arranged in a zigzag state or in parallel to form a continuous recording head so as to give the intended length. Alternatively, such a construction (FIG. 2) that one recording head integrally formed so as to have a continuous nozzle row is used may also be adopted.

The above-described recording apparatus of the serial type or line type is an example where a head independently or integrally formed for 4 color inks (Y, M, C and K) is used, or an example where a head of the construction of 5 nozzle rows in which black ink nozzles 211 and 215 are respectively provided for applying only a black ink by 2 divisions is installed. It is also favorable as a mode suitable for dividing the number of applications into about 2 to 12 using 4 nozzle rows to duplicatively mount inks of the same color as to at least one ink of 4 color inks (Y, M, C and K). For example, construction of 8 nozzle rows or construction of 12 nozzle rows in which 2 or 3 heads each having 4 nozzle rows are continuously connected is also mentioned.

As a specific example where an ink of the same color is applied at plural timings, is mentioned a mode in which the ink is applied by 2 applications in one scanning using the serial type recording apparatus. As a mode to apply the black ink by 2 applications in one scanning, the construction of a head using the recording head illustrated in FIG. 3 is described as an example. A particularly favorable mode is to eject black (K), cyan (C), magenta (M), yellow (Y) and black (K) inks by the nozzle rows 211, 212, 213, 214 and 215, respectively. The speed of the carriage, on which this recording head is mounted, and/or the widths of the 2 nozzle rows for the black inks are changed, whereby the time of application of the ink of one color to the fundamental matrix can be controlled within the range of 1 msec or more and 200 msec or less.

According to the ink jet recording apparatus of the present invention, when such an image that the total amount of inks applied to a fundamental matrix for forming the image is 5.0 $\mu l/cm^2$ or less and the duty of an ink of a color is 80% duty or more is formed in the fundamental matrix, the application of the ink of a color is conducted at plural timings. In addition, the amount of the ink applied at each timing is controlled to 0.7 $\mu l/cm^2$ or less. Further, the time from the beginning of application of the ink to the fundamental matrix to completion of the application is favorably controlled within a range of 1 msec or more and 200 msec or less. The ink jet recording apparatus of the present invention has a control mechanism for conducting such divided applications. The operation of the ink jet recording head and the timing of conveyance operation of plain paper are controlled by this control mechanism to conduct such divided applications.

The number of divisions of the application of the ink of a color can be set according to desired recording conditions. An example where the application is divided into 2 is illustrated in FIG. 4. This example is an example where the resolution of a fundamental matrix is 1,200 dpi (width)×1,200 dpi (length), and an image having a portion with a duty of 100% is formed. In FIG. 4, the impact positions of the ink applied at the first time and the impact positions of the ink applied at the second time are illustrated as the first ink and the second ink, respectively. The first ink and second ink are respectively applied in a fixed amount.

EXAMPLES

The present invention will hereinafter be described more specifically by the following Examples and Comparative Examples. Incidentally, all designations of "part" or "parts" and "%" in the following examples mean part or parts by mass and % by mass unless expressly noted. The surface tension of each ink was measured by CBVP-Z (manufactured by Kyowa Interface Science Co., Ltd.). The viscosity was measured by a RE80 type viscometer (manufactured by TOKI SANGYO CO., LTD.). The average particle size of each self-dispersion pigment was measured by Nanotrac UPA 150EX (manufactured by NIKKISO; measured as a 50% cumulative value).

First of all, preparation processes of respective pigment dispersions contained in inks used in Examples and Comparative Examples are described.

—Preparation of Pigment Dispersion—
<Preparation of Dispersion A-1 of Self-Dispersion Pigment to a Surface of which an Anionic Functional Group Represented by Chemical Formula (1) has been Bonded>

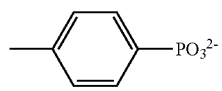

Chemical Formula (1)

After 10 g of carbon black having a specific surface area of 320 m²/g and a DBP oil absorption of 110 ml/100 g and 3.2 g of 4-aminobenzenephosphonic acid were fully mixed with 70 g of water, 1.62 g of nitric acid was added dropwise to the resultant mixture, and the mixture was stirred at 70° C. After several minutes, a solution with 1 g of sodium nitrite dissolved in 5 g of water was added thereto, and stirring was conducted for additional 1 hour. The resultant slurry was filtered through filter paper (trade name: Toyo Filter Paper No. 2; product of Advantice Co.), and the thus-filtered pigment particles were fully washed with water and dried in an oven controlled to 90° C. A black pigment with the group represented by Chemical Formula (1) introduced into the surface of carbon black was prepared by the above-described process.

The surface functional group density of the black pigment prepared above was determined by converting a value obtained by subjecting the black pigment to neutralization titration with sodium hydroxide and found to be 600 μmol/g. The 50% cumulative particle size of the black pigment prepared above was measured by Nanotrac UPA 150EX (manufactured by NIKKISO) and found to be 120 nm. This pigment was adjusted with ion-exchanged water and an aqueous solution of sodium hydroxide so as to give a pigment concentration of 10% and a pH of 7.5. The resultant dispersion was further filtered by using a prefilter and a filter having a pore size of 1 μm in combination to obtain Self-dispersion Pigment Dispersion A-1.

<Preparation of Dispersion A-2 of Self-Dispersion Pigment to a Surface of which an Anionic Functional Group Represented by Chemical Formula (1) has been Bonded>

Self-dispersion Pigment Dispersion A-2 was obtained in the same manner as in the preparation of Self-dispersion Pigment Dispersion A-1 except that the adjustment of the pH was conducted by using the equimolar amount of aqueous ammonia in place of the aqueous solution of sodium hydroxide.

<Preparation of Dispersion B of Self-Dispersion Pigment Having a Lactone Group>

To 3,750 g of ion-exchanged water, was added 100 g of carbon black having a specific surface area of 320 m²/g and a DBP oil absorption of 110 ml/100 g, and the resultant mixture was heated to 50° C. with stirring. Thereafter, an aqueous solution of 4,500 g of sodium hypochlorite (available chlorine concentration: 12%) was added dropwise over 3 hours at 50° C. while being pulverized by a bead mill using zirconia beads having a diameter of 0.5 mm. Thereafter, pulverization was further conducted for 30 minutes to obtain a reaction mixture containing self-dispersion carbon black. After the reaction mixture was fractionated, neutralization was conducted with aqueous ammonia, and desalting was conducted by an ultrafilter until the conductivity became 1.5 mS/cm. After the thus-treated liquid was adjusted so as to give a concentration of the self-dispersion carbon black of 10%, the liquid was filtered by using a prefilter and a filter having a pore size of 1 μm in combination to obtain Self-dispersion Pigment Dispersion B.

<Preparation of Self-Dispersion Pigment Dispersion C>

Self-dispersion Pigment Dispersion C was obtained in the same manner as in the preparation of Self-dispersion Pigment Dispersion A-1 except that C.I. Pigment Yellow 74 was used in place of carbon black.

<Preparation of Self-Dispersion Pigment Dispersion D>

Self-dispersion Pigment Dispersion D was obtained in the same manner as in the preparation of Self-dispersion Pigment Dispersion A-1 except that C.I. Pigment Red 122 was used in place of carbon black.

<Preparation of Self-Dispersion Pigment Dispersion E>

Self-dispersion Pigment Dispersion E was obtained in the same manner as in the preparation of Self-dispersion Pigment Dispersion A-1 except that C.I. Pigment Blue 15:3 was used in place of carbon black.

Preparation Examples of Inks for Examples of the present invention and Comparative Examples are then described. Water used was ion-exchanged water.

Example 1

Preparation of Ink 1

After the following components (100 parts in total) were mixed for 2 hours, the resultant mixture was filtered through a filter having a pore size of 2.5 μm to obtain Ink 1 of Example. The surface tension of the ink was 30 mN/m, the average particle size of the self-dispersion pigment was 120 nm, and the viscosity of the ink was 3.1 mPa·s.

| | |
|---|---|
| Self-dispersion Pigment Dispersion A-1: | 50 parts |
| Ammonium phthalate: | 0.5 parts |
| Trimethylolpropane (hydrophilicity-hydrophobicity coefficient: 0.31): | 20 parts |
| Isopropyl alcohol: | 1 part |
| Ethylene oxide adduct of acetylene glycol (trade name: OLFINE E1010, product of Nisshin Chemical Industry Co., Ltd., HLB value: 10 or more): | 1 part |
| Water: | balance. |

Example 2

Preparation of Ink 2

After the following components (100 parts in total) were mixed for 2 hours, the resultant mixture was filtered through a filter having a pore size of 2.5 μm to obtain Ink 2 of Example. The surface tension of the ink was 30 mN/m, the average particle size of the self-dispersion pigment was 120 nm, and the viscosity of the ink was 3.0 mPa·s.

| | |
|---|---|
| Self-dispersion Pigment Dispersion A-1: | 50 parts |
| Ammonium phthalate: | 0.5 parts |
| Trimethylolpropane (hydrophilicity-hydrophobicity coefficient: 0.31): | 15 parts |
| 1,2-Hexanediol (hydrophilicity-hydrophobicity coefficient: 0.97): | 5 parts |
| Isopropyl alcohol: | 1 part |
| Ethylene oxide adduct of acetylene glycol (trade name: OLFINE E1010, product of Nisshin Chemical Industry Co., Ltd., HLB value: 10 or more): | 1 part |
| Water: | balance. |

Example 3

Preparation of Ink 3

After the following components (100 parts in total) were mixed for 2 hours, the resultant mixture was filtered through a filter having a pore size of 2.5 μm to obtain Ink 3 of Example. The surface tension of the ink was 30 mN/m, the average particle size of the self-dispersion pigment was 120 nm, and the viscosity of the ink was 3.0 mPa·s.

| | |
|---|---|
| Self-dispersion Pigment Dispersion A-1: | 50 parts |
| Ammonium benzoate: | 0.5 parts |
| Trimethylolpropane (hydrophilicity-hydrophobicity coefficient: 0.31): | 15 parts |
| 1,2-Hexanediol (hydrophilicity-hydrophobicity coefficient: 0.97): | 5 parts |
| Isopropyl alcohol: | 1 part |
| Ethylene oxide adduct of acetylene glycol (trade name: OLFINE E1010, product of Nisshin Chemical Industry Co., Ltd., HLB value: 10 or more): | 1 part |
| Water: | balance. |

Example 4

Preparation of Ink 4

After the following components (100 parts in total) were mixed for 2 hours, the resultant mixture was filtered through a filter having a pore size of 2.5 μm to obtain Ink 4 of Example. The surface tension of the ink was 31 mN/m, the average particle size of the self-dispersion pigment was 120 nm, and the viscosity of the ink was 3.2 mPa·s.

| | |
|---|---|
| Self-dispersion Pigment Dispersion A-2: | 50 parts |
| Ammonium phthalate: | 0.5 parts |
| Trimethylolpropane (hydrophilicity-hydrophobicity coefficient: 0.31): | 10 parts |
| 1,2-Hexanediol (hydrophilicity-hydrophobicity coefficient: 0.97): | 5 parts |
| 1,6-Hexanediol (hydrophilicity-hydrophobicity coefficient: 0.76): | 5 parts |
| Isopropyl alcohol: | 1 part |
| Ethylene oxide adduct of acetylene glycol (trade name: OLFINE E1010, product of Nisshin Chemical Industry Co., Ltd., HLB value: 10 or more): | 1 part |
| Water: | balance. |

Example 5

Preparation of Ink 5

After the following components (100 parts in total) were mixed for 2 hours, the resultant mixture was filtered through a filter having a pore size of 2.5 μm to obtain Ink 5 of Example. The surface tension of the ink was 30 mN/m, the average particle size of the self-dispersion pigment was 120 nm, and the viscosity of the ink was 3.1 mPa·s.

| | |
|---|---|
| Self-dispersion Pigment Dispersion A-1: | 25 parts |
| Self-dispersion Pigment Dispersion A-2: | 25 parts |
| Ammonium phthalate: | 0.5 parts |
| Trimethylolpropane (hydrophilicity-hydrophobicity coefficient: 0.31): | 15 parts |
| 1,2-Hexanediol (hydrophilicity-hydrophobicity coefficient: 0.97): | 5 parts |
| Isopropyl alcohol: | 1 part |
| Ethylene oxide adduct of acetylene glycol (trade name: OLFINE E1010, product of Nisshin Chemical Industry Co., Ltd., HLB value: 10 or more): | 1 part |
| Water: | balance. |

Example 6

Preparation of Ink 6

Ink 6 of Example was obtained in the same manner as in the preparation of Ink 2 except that 25 parts of Self-dispersion Pigment Dispersion A-1 and 25 parts of Self-dispersion Pigment Dispersion B were used in place of 50 parts of Self-dispersion Pigment Dispersion A-1. The surface tension of the ink was 29 mN/m, the average particle size of the self-dispersion pigment was 130 nm, and the viscosity of the ink was 3.3 mPa·s.

Example 7

Preparation of Ink 7

Ink 7 of Example was obtained in the same manner as in the preparation of Ink 2 except that 40 parts of Self-dispersion Pigment Dispersion C was used in place of 50 parts of Self-dispersion Pigment Dispersion A-1. The surface tension of the ink was 29 mN/m, and the average particle size of the self-dispersion pigment was 120 nm.

Example 8

Preparation of Ink 8

Ink 8 of Example was obtained in the same manner as in the preparation of Ink 2 except that 40 parts of Self-dispersion Pigment Dispersion D was used in place of 50 parts of Self-dispersion Pigment Dispersion A-1. The surface tension of the ink was 29 mN/m, and the average particle size of the self-dispersion pigment was 125 nm.

Example 9

Preparation of Ink 9

Ink 9 of Example was obtained in the same manner as in the preparation of Ink 2 except that 40 parts of Self-dispersion Pigment Dispersion E was used in place of 50 parts of Self-dispersion Pigment Dispersion A-1. The surface tension of the ink was 29 mN/m, and the average particle size of the self-dispersion pigment was 130 nm.

Comparative Example 1

Preparation of Ink 10

Ink 10 of Comparative Example was obtained in the same manner as in the preparation of Ink 1 except that the content of the ethylene oxide adduct of acetylene glycol was changed from 1 part to 0.1 part. The surface tension of the ink was 40 mN/m, and the particle size of the self-dispersion pigment was 120 nm.

Comparative Example 2

Preparation of Ink 11

Ink 11 of Comparative Example was obtained in the same manner as in the preparation of Ink 2 except that ammonium phthalate was not added. The surface tension of the ink was 29 mN/m, and the particle size of the self-dispersion pigment was 120 nm.

Comparative Example 3

Preparation of Ink 12

Ink 12 of Comparative Example was obtained in the same manner as in the preparation of Ink 1 except that trimethylolpropane was changed to glycerol (hydrophilicity-hydrophobicity coefficient: 0.11). The surface tension of the ink was 29 mN/m, and the particle size of the self-dispersion pigment was 120 nm.

Inks 1 to 9 prepared for Examples, and Inks 10 to 12 prepared for Comparative Examples were used to evaluate recorded articles under the following conditions, thereby providing examples of image forming methods and recording apparatus for the present invention and comparison.

—Evaluation Conditions—
Recording Media:
OP paper: Office Planner Paper for PPC/BJ common use (plain paper; product of Canon Marketing Japan Inc.)
EW paper: White Recycle Paper EW-100 (plain paper; product of Canon Marketing Japan Inc.)
Printer A:
F930 (manufactured by Canon Inc.; 6 nozzle rows each including 512 nozzles; ink quantity: 4.0 pl (fixed amount); resolution of fundamental matrix: 1,200 dpi (width)×1,200 dpi (length))
Image Forming Method:
Ordinary Printing:

Each ink was mounted in a black ink head part of the printer to print a solid print image of 100% duty. Upon printing with 2 or more colors, inks were mounted in their corresponding ink head parts of black, cyan, magenta and yellow to print a solid print image. In ordinary 1-pass printing, the amount of the ink applied at a time upon the formation of the solid print image was controlled to 1.0 µl/cm$^2$. In ordinary 2-pass printing, the application of the ink upon the formation of the solid print image was divided into 2 applications, the amount of the ink applied at a time was controlled to a fixed amount of 0.5 µl/cm$^2$, and the total amount of the ink applied was controlled to 1.0 µl/cm$^2$.

Printing by Divided Application:

Upon printing by 2 divided applications, inks were put into ink tanks and were respectively mounted in a black ink head part and a cyan ink head part of the printer unless expressly noted to print a solid print image of 100% duty. The time interval between the inks ejected from the black ink head part and the cyan ink head part was 12 msec. Upon printing with 2 or more colors, one ink selected from black, cyan, magenta and yellow inks was mounted in the black ink head part and the cyan ink head part of the printer unless expressly noted. Another ink was mounted in a photocyan ink head part and a magenta ink head part of the printer, and further another ink was mounted in a photomagenta ink head part and a yellow ink head part. In such a manner, a solid print image was printed. Here, since the recording head used in Examples is of the 6 nozzle rows, printing with 3 kinds of inks is feasible in double-divided application. However, the number of nozzle rows is changed to 8 rows, whereby printing with 4 kinds of inks is feasible with double-divided application. No particular limitation is imposed on printing upon triple-divided application. However, the printing can be conducted by mounting one ink in the black ink head part, photomagenta ink head part and magenta ink head part of the printer. Upon the formation of a solid print image in 1-pass double-divided application printing, the amount of the ink applied from one nozzle row was controlled to a fixed amount of 0.5 µl/cm$^2$, and the total amount of the ink applied was controlled to 1.0 µl/cm$^2$.

Recorded articles obtained with the inks prepared in Examples 1 to 9, and Comparative Examples 1 to 3 were evaluated as to image density (O.D.), fixability and small letter printing, and the results are shown in Table 2. The printing conditions were changed to double-divided application 1-pass printing to similarly evaluate recorded articles as to image density (O.D.), fixability and small letter printing. The results are shown in Table 3. Evaluation as to images was made by using a black head and printing a solid print image (3 cm×3 cm) and JIS first level Chinese letters of 5 point. Incidentally, the images were evaluated according to the following respective evaluation methods and criteria.

—Image Density—

As to the black inks, O.D. of a solid print image was measured by a densitometer (Macbeth RD915; manufactured by Macbeth Co.).
A: O.D. was 1.50 or more;
B: O.D. was 1.40 or more and less than 1.50;
C: O.D. was 1.30 or more and less than 1.40;
D: O.D. was less than 1.30;
—: Not evaluated (color inks).

—Fixability—

After 10 seconds from the printing of the solid print image, silbon paper was pressed against the print to visually evaluate the degree of transfer according to the following evaluation criteria.
A: No transfer is observed;
B: Transfer is slightly observed;
C: Transfer is clearly observed.

—Small Letter Printing—

The sharpness of small Chinese letters printed was visually evaluated according to the following evaluation criteria.
A: Even complex letters can be expressed;
B: Outlines are slightly disordered in complex letters, but it is within an allowable range;
C: Complex letters cannot be sufficiently expressed;
D: Disorder was observed even in simple letters in some cases.

TABLE 2

Evaluation results in ordinary 4-pass printing

|  |  | Image density | | Fixability | | Small letter printing | |
|---|---|---|---|---|---|---|---|
|  | Ink | OP paper | EW paper | OP paper | EW paper | OP paper | EW paper |
| Ex. 1 | 1 | A | A | A | A | A | A |
| Ex. 2 | 2 | A | A | A | A | A | A |
| Ex. 3 | 3 | A | A | A | A | A | A |
| Ex. 4 | 4 | A | A | A | A | A | A |
| Ex. 5 | 5 | A | A | A | A | A | A |
| Ex. 6 | 6 | A | A | A | A | A | A |
| Ex. 7 | 7 | — | — | A | A | A | A |
| Ex. 8 | 8 | — | — | A | A | A | A |
| Ex. 9 | 9 | — | — | A | A | A | A |

TABLE 2-continued

Evaluation results in ordinary 4-pass printing

| Ink | | Image density | | Fixability | | Small letter printing | |
|---|---|---|---|---|---|---|---|
| | | OP paper | EW paper | OP paper | EW paper | OP paper | EW paper |
| Comp. Ex. 1 | 10 | A | B | C | C | A | A |
| Comp. Ex. 2 | 11 | A | B | A | A | A | A |
| Comp. Ex. 3 | 12 | A | B | A | A | C | C |

TABLE 3

Evaluation results in double-divided application 1-pass printing

| Ink | | Image density | | Fixability | | Small letter printing | |
|---|---|---|---|---|---|---|---|
| | | OP paper | EW paper | OP paper | EW paper | OP paper | EW paper |
| Ex. 10 | 1 | A | A | A | A | A | A |
| Ex. 11 | 2 | A | A | A | A | A | A |
| Ex. 12 | 3 | A | A | A | A | A | A |
| Ex. 13 | 4 | A | A | A | A | A | A |
| Ex. 14 | 5 | A | A | A | A | A | A |
| Ex. 15 | 6 | A | A | A | A | A | A |
| Comp. Ex. 4 | 10 | A | B | C | C | A | A |
| Comp. Ex. 5 | 11 | B | B | B | B | B | B |
| Comp. Ex. 6 | 12 | B | C | A | A | C | C |

When Examples 1 and 10 are compared with Comparative Examples 1 and 4, it is understood that in the inks according to the present invention, the surface tension of each ink is controlled to 34 mN/m or less, whereby the image density is made high, and the fixability is improved.

When Examples 2 and 11 are compared with Comparative Examples 2 and 5, it is understood that the inks according to the present invention contain the ammonium salt of an organic carboxylic acid, whereby the image quality is improved in both ordinary printing and divided application printing. This is probably because the solid-liquid separation after impact of the pigment on the paper surface was promoted.

When Examples 1 to 9 and Examples 10 to 15 are compared with Comparative Example 3 and Comparative Example 6, respectively, it is understood that the inks according to the present invention contain a water-soluble compound having a hydrophilicity-hydrophobicity coefficient of 0.26 or more, whereby the image density is made high, and fixability, small letter printing and uniformity are improved.

The black inks prepared in Examples 1 to 6 and Comparative Examples 1 to 3, and the color inks prepared in Examples 7 to 9 were used to evaluate recorded articles as to bleeding. The bleeding was evaluated by adjacently printing solid print images of black and color inks under the same condition and visually observing the condition of the boundary portion therebetween. The results are shown in Table 4. The printing was conducted by ordinary 2-pass printing. Evaluation standard is as follows.

—Bleeding—
A: Bleeding is not observed;
B: Bleeding is slightly observed, but it is within an allowable range;
C: Bleeding is observed;
D: Bleeding is markedly observed.

TABLE 4

Evaluation of bleeding

| | Bk ink | Color ink | Recording medium | Bleeding |
|---|---|---|---|---|
| Ex. 16 | 1 | 7-9 | OP paper | A |
| Ex. 17 | 1 | 7-9 | EW paper | B |
| Ex. 18 | 2 | 7-9 | OP paper | A |
| Ex. 19 | 2 | 7-9 | EW paper | A |
| Ex. 20 | 3 | 7-9 | OP paper | A |
| Ex. 21 | 3 | 7-9 | EW paper | A |
| Comp. Ex. 7 | 10 | 7-9 | OP paper | C |
| Comp. Ex. 8 | 10 | 7-9 | EW paper | D |
| Comp. Ex. 9 | 11 | 7-9 | OP paper | B |
| Comp. Ex. 10 | 11 | 7-9 | EW paper | B |
| Comp. Ex. 11 | 12 | 7-9 | OP paper | C |
| Comp. Ex. 12 | 12 | 7-9 | EW paper | D |

Although each black ink was evaluated as to bleeding using the respective color inks, the results were equivalent among any color inks.

When Examples 16 and 17 are compared with Comparative Examples 7 and 8, it is understood that the surface tension of each ink is controlled to 34 mN/m or less, whereby bleeding is well inhibited.

When Examples 18 and 19 are compared with Comparative Examples 9 and 10, it is understood that the inks according to the present invention contain the ammonium salt of an organic carboxylic acid, whereby solid-liquid separation of the pigment after the impact on the surface layer of paper is accelerated, and so bleeding is well inhibited.

When Examples 16 to 21 are compared with Comparative Examples 11 and 12, it is understood that the inks according to the present invention contain a water-soluble compound having a hydrophilicity-hydrophobicity coefficient of 0.26 or more, whereby bleeding is well inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-012086, filed Jan. 22, 2009, which is hereby incorporated by reference herein in its entirety.

The invention claimed is:

1. An ink jet recording ink comprising:
   (i) a self-dispersion pigment to a surface of which an anionic functional group represented by the following general formula (1) is bonded directly or through another atomic group,
   (ii) an ammonium salt of an organic carboxylic acid,
   (iii) water, and
   (iv) a water-soluble compound having a hydrophilicity-hydrophobicity coefficient of 0.26 or more as defined by the following equation (A), the ink having a surface tension of 34 mN/m or less,

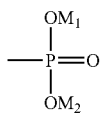

General formula (1)

wherein $M_1$ and $M_2$ are, independently of each other, a hydrogen atom, alkali metal, ammonium or organic ammonium, hydrophilicity-hydrophobicity coefficient =[(Water activity of a 20% aqueous solution)−(Molar fraction of water in the 20% aqueous solution)]/ [1−(Molar fraction of water in the 20% aqueous solution)] (A), and
wherein an amount of the ammonium salt of the organic carboxylic acid added into the ink is 0.05% by mass or more and 3% by mass or less.

2. The ink jet recording ink according to claim 1, which comprises a water-soluble compound having a hydrophilicity-hydrophobicity coefficient of 0.26 or more and 0.37 or less as defined by the equation (A) and a water-soluble compound having a hydrophilicity-hydrophobicity coefficient of 0.37 or more as defined by the equation (A).

3. The ink jet recording ink according to claim 2, wherein the ink contains two or more water-soluble compounds having a hydrophilicity-hydrophobicity coefficient of 0.37 or more as defined by the equation (A).

4. The ink jet recording ink according to claim 1, wherein the self-dispersion pigment has an average particle size of 60 nm or more and 145 nm or less.

5. The ink jet recording ink according to claim 1, wherein $M_1$ and $M_2$ in the general formula (1) are an alkali metal and ammonium respectively, and $M_1/M_2$ is 1/10 or more and 10/1 or less.

6. The ink jet recording ink according to claim 1, which further comprises a self-dispersion pigment having a lactone group.

7. An ink jet image forming method for forming an image by applying the ink according to claim 1 to a recording medium with an ink jet recording system,
wherein the ink is applied in a fixed amount of 0.5 pl or more and 6.0 pl or less, and
wherein when the total amount of inks applied to a fundamental matrix for forming the image is 5.0 μl/cm² or less, and the duty of at least one ink of a color of the inks applied to the fundamental matrix is 80% duty or more, the application of the at least one ink to the fundamental matrix is conducted at plural timings, and the amount of the at least one ink applied at each timing is controlled to 0.7 μl/cm² or less.

8. The ink jet image forming method according to claim 7, wherein the application of the ink is conducted by action of thermal energy.

9. The ink jet image forming method according to claim 7, wherein the application of the at least one ink to the fundamental matrix is conducted within a range of 1 msec or more and 200 msec or less.

10. The ink jet image forming method according to claim 7, wherein the fundamental matrix has a resolution of 600 dpi or more and 4,800 dpi or less.

11. An ink jet recording apparatus equipped with a recording head for forming an image by applying the ink according to claim 1 to plain paper with an ink jet recording system,
wherein the apparatus comprises a control mechanism for controlling the application of the ink such that the ink is applied in a fixed amount of 0.5 pl or more and 6.0 pl or less, and when the total amount of inks applied to a fundamental matrix for forming the image is 5.0 μl/cm² or less, and the duty of at least one ink of a color of the inks applied to the fundamental matrix is 80% duty or more, the application of the at least one ink to the fundamental matrix is conducted at plural timings, and the amount of the at least one ink applied at each timing is controlled to 0.7 μl/cm² or less.

12. The ink jet recording apparatus according to claim 11, wherein the recording head is a recording head in which the application of the ink is conducted by action of thermal energy.

13. The ink jet recording apparatus according to claim 11, wherein the recording head has a plurality of nozzle rows, and the at least one ink is applied from the plurality of nozzle rows.

* * * * *